US007657757B2

(12) United States Patent
Feldman

(10) Patent No.: US 7,657,757 B2
(45) Date of Patent: Feb. 2, 2010

(54) SEMICONDUCTOR DEVICE AND METHOD UTILIZING VARIABLE MODE CONTROL WITH BLOCK CIPHERS

(75) Inventor: Joel Feldman, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1141 days.

(21) Appl. No.: 10/426,560

(22) Filed: Apr. 30, 2003

(65) Prior Publication Data

US 2004/0250095 A1    Dec. 9, 2004

(51) Int. Cl.
*G06F 17/00* (2006.01)
(52) U.S. Cl. ...................................................... 713/191
(58) Field of Classification Search .................. 380/37, 380/29, 28, 52; 713/192, 191; 726/9, 20
See application file for complete search history.

(56) References Cited

U.S. PATENT DOCUMENTS

| | | | | |
|---|---|---|---|---|
| 4,274,085 | A * | 6/1981 | Marino, Jr. .................... | 380/29 |
| 4,614,697 | A | 9/1986 | Oka et al. | |
| 5,673,319 | A | 9/1997 | Bellare et al. | |
| 6,101,255 | A | 8/2000 | Harrison et al. | |
| 6,408,074 | B1 | 6/2002 | Loughran | |
| 6,704,871 | B1 * | 3/2004 | Kaplan et al. ............... | 713/192 |
| 6,708,273 | B1 * | 3/2004 | Ober et al. .................. | 713/189 |
| 6,870,929 | B1 * | 3/2005 | Greene ........................ | 380/28 |
| 6,957,403 | B2 * | 10/2005 | Wang et al. ..................... | 716/3 |
| 7,046,802 | B2 * | 5/2006 | Rogaway ..................... | 380/37 |
| 2001/0037458 | A1 * | 11/2001 | Kean .......................... | 713/193 |
| 2002/0191790 | A1 * | 12/2002 | Anand et al. ............... | 380/255 |
| 2003/0191950 | A1 * | 10/2003 | Patel et al. .................. | 713/189 |

FOREIGN PATENT DOCUMENTS

EP        0895614 B1    12/2001

OTHER PUBLICATIONS

Dworkin, Morris, "Recommendation for Block Cipher Modes of Operation," NIST Special Publication 800-xx. National Institute of Standards & Technology, U.S. Dept. of Commerce, Jul. 2001, 66 pp.
Jutia, Charanjit S., "Parallellzable Encryption Mode with Almost Free Message Integrity," 2nd NIST AES Modes Workshop, Aug. 2001, 23 pp.
Lipmaa, Helger; Rogaway, Phillip; Wagner, David, "Comments to NIST concerning AES Modes of Operations: CTR-Mode Encryption," 2nd NIST AES Modes Workshop, Aug. 2001, 4 pp.
Rogaway, Phillip; Bellare. Mihir: Black, John: Krovetz. Ted. "OCB: A Block-Cipher Mode of Operation for Efficient Authenticated Encryption," 2nd NIST AES Modes Workshop. Aug. 2001, [online] [Retrieved from the Internet Jul. 2, 2003 at URL <http://citeseer.nj.nec.com/rogaway01ocb.html> 36 pp.
Whiting, Doug; Housley, Russ; Ferguson, Niels, "Counter with CBC-MAC (CCM), AES Mode of Operation," Submission to NIST, (date unknown), 9 pp.
Whiting, Doug; Housley, Russ; Ferguson, Niels, "Counter with CBC-MAC (CCM)," Internet Engineering Task Force, Internet draft, Jan. 2003, 40 pp.

* cited by examiner

*Primary Examiner*—Ellen Tran

(57) ABSTRACT

The present disclosure relates generally to semiconductor devices and related methods of operation. A semiconductor device is disclosed that comprises at least one cipher interface (126, 128) to a plurality of different cipher hardware modules (112, 114, 116) and central mode control logic (130-138, 106) responsive to the at least one cipher interface (126, 128). The central mode control logic (130-138, 106) is configured to provide a cipher operation in accordance with a selected cipher mode (104) in connection with at least one of the plurality of different cipher hardware modules (112, 114, 116).

20 Claims, 5 Drawing Sheets

SEMICONDUCTOR DEVICE AND METHOD UTILIZING VARIABLE MODE CONTROL WITH BLOCK CIPHERS

FIELD OF DISCLOSURE

The present disclosure relates generally to variable mode control of security functions that use cipher blocks.

DESCRIPTION OF THE RELATED ART

The rapid growth of computer network infrastructure, particularly in wireless networks, has driven the need for secure communication in order to provide privacy and integrity of data. Several standard algorithms have been established to perform block cipher encryptions. These algorithms have been specified across multiple security protocols, such as Internet Protocol Security Protocol (IPSec), Transport Layer Security (TLS), and Institute of Electrical and Electronics Engineers (IEEE) 802.11. While these protocols specify common cipher algorithms, the mode of operation for these algorithms varies from one standard to another. In order to support multiple independent protocols, these varied cipher modes of operation also need to be supported. These cipher modes typically operate independently of the underlying encryption algorithms.

While data encryption can be performed in software, it can generally be performed much more efficiently through dedicated hardware. Thus, it would be desirable to implement multiple modes of cipher operation in hardware, such as in a security processor or other type of semiconductor device.

Accordingly, there is a need for an improved hardware implemented security device, such as a semiconductor device, and a method of performing encryption functions suitable for handling variable modes of operation.

BRIEF DESCRIPTION OF THE DRAWINGS

The use of the same reference symbols in different drawings indicates similar or identical items.

DETAILED DESCRIPTION

The present disclosure relates generally to semiconductor devices and related methods of operation. A semiconductor device is disclosed that comprises at least one cipher interface to a plurality of different cipher hardware modules and central mode control logic responsive to the at least one cipher interface to implement a security function such as encryption or decryption. The central mode control logic is configured to implement a cipher operation in accordance with a selected cipher mode in connection with at least one of the plurality of different cipher hardware modules.

Figure 1:
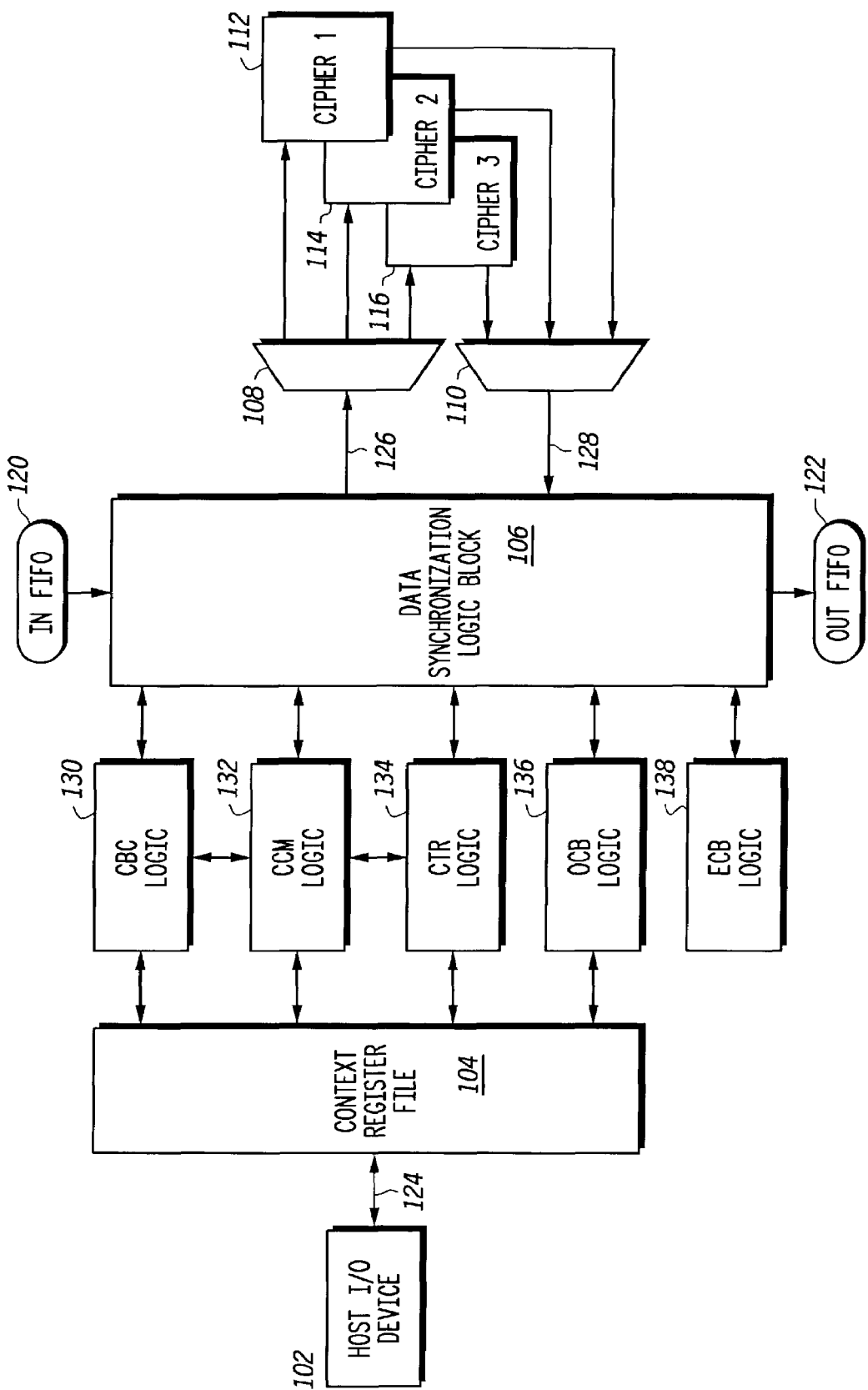
FIG. 1 is a block and logic diagram that illustrates an embodiment of a system.

Referring to FIG. 1, an overall architecture for a system that may be implemented in hardware, such as within a semiconductor device, is illustrated. The semiconductor device may be a microprocessor customized to perform a security function. Alternate embodiments may implement selected portions of the present disclosure in software rather than hardware. The architecture includes a context register file 104, a data synchronization logic block 106, a demultiplexor 108, a multiplexor 110, and a plurality of cipher engine blocks 112, 114, and 116. The cipher engine blocks may be implemented as hardware modules. The system also includes a plurality of different cipher logic modules, such as cipher block chaining (CBC) logic module 130, counter (CTR) with CBC-MAC (message authentication code) (CCM) logic module 132, counter (CTR) logic module 134, offset code book (OCB) logic 136, and pass-thru electronic code book (ECB) logic 138. The data synchronization block 106 and cipher logic modules 130-138 form at least a portion of central mode control logic responsive to an interface 126, 128 to at least one of the cipher engine blocks 112, 114, and 116. The context register file 104 is coupled to an external host device 102 via input/output interface 124. An example of a suitable host device is a separate programmable computer that may download configuration data and other data for programming and initializing the context register file 104. The cipher mode register 104 may store a dynamic context data item such as an initialization vector, offset data, a counter, or a checksum. The data synchronization block 106 is responsive to an input data buffer such as the input first in first out (FIFO) buffer 120. The data synchronization block 106 is also coupled at its output to an output data buffer, such as the output FIFO buffer 122. Alternate embodiments may use any appropriate type of storage to interface with the data synchronization logic block 106.

During operation, the context register file 104 is configured via the host device 102 to select and configure one of the logic modules 130, 132, 134, 136, or 138. The selected logic module is used to implement a specific cipher mode for a particular application or data stream being received. Once the context register file 104 is configured to implement a specific cipher mode, data which may need to be encrypted, decrypted, or otherwise modified by the cipher mode selected is received at the data synchronization block 106, such as from FIFO 120. Processing of the received data is controlled by the selected logic block, which can modify the received data and/or provide the received data, after pre-processing by synchronization block 106, if any, to one or more of the cipher engines 112, 114 and 116. Data processed by the cipher engines 112, 114 and 116 is returned to the data synchronized block 106 for further processing as needed, before being provided at an output, e.g., to the FIFO 122.

After selecting a specific cipher mode by initialization of the context register file 104 via the host device 102, data from the input FIFO 120 is fed into the data synchronization block 106. The data synchronization block 106 controls processing of the data and may implement security operations such as encryption and decryption functions using various modes of operation. The data synchronization block 106 has a first cipher interface 126 to the demultiplexor 108 and a second cipher interface 128 to the multiplexor 110 to select one of the hardware cipher blocks 112, 114 and 116. Using the interfaces 126 and 128 to the demultiplexor 108 and multiplexor 110, the data synchronization block 106 may access the different cipher engines such as engines 112, 114 and 116. In addition, the data synchronization block 106, while implementing security operations has access to logic 130-138 for different cipher modes. An example where five different cipher modes may be accessed by the data synchronization block 106 is illustrated in FIG. 1. After performing the security function using the selected cipher mode logic and using the appropriate cipher engine, the processed data from the security operation is then fed to the output FIFO 122. Alternate embodiments may support any desired number of cipher modes.

The specific architecture disclosed in FIG. 1 beneficially reduces redundant logic while providing multiple mode support for a plurality of different cipher block algorithms. While one cipher engine is typically used at a time, there is no present limit to the number of cipher functions that may be connected within this architecture. Thus, the architecture is flexible and may support the addition of future cipher algorithms. Each cipher mode of operation is implemented with its own separate logic module 130-138. The particular logic blocks share the common context register file 104 which is used to store shared data, such as the initialization vector (IV), offsets, counters, checksums, or any other dynamic context data. The context register file 104 can be accessed by the host device 102 in order to set up context for a new message to be received from the FIFO 120 or to restore context from a previous message thread, where a specific message or message thread generally comprises one or more blocks of data.

If necessary, data synchronization block 106 processes a block of data from the input FIFO 120 before passing it into the selected cipher mode logic block. In alternate embodiments, data synchronization block 106 may pass on the block of data without processing. In some embodiments, the input data block is formatted as necessary by the selected cipher mode logic block (e.g., one of logic modules 130-138) before being passed back through the data synchronization block 106 into the selected cipher engine (e.g., one of 112, 114, or 116). When the selected cipher engine finishes processing the data block, the data received back from the selected cipher engine is passed back to the selected cipher mode logic block for any necessary post processing and the message context register file 104 may be updated if required. In the illustrated embodiment, the final data block is directed to the output FIFO 122. Alternate embodiments may direct the final data block in a different manner and/or to a different destination.

Figure 2:
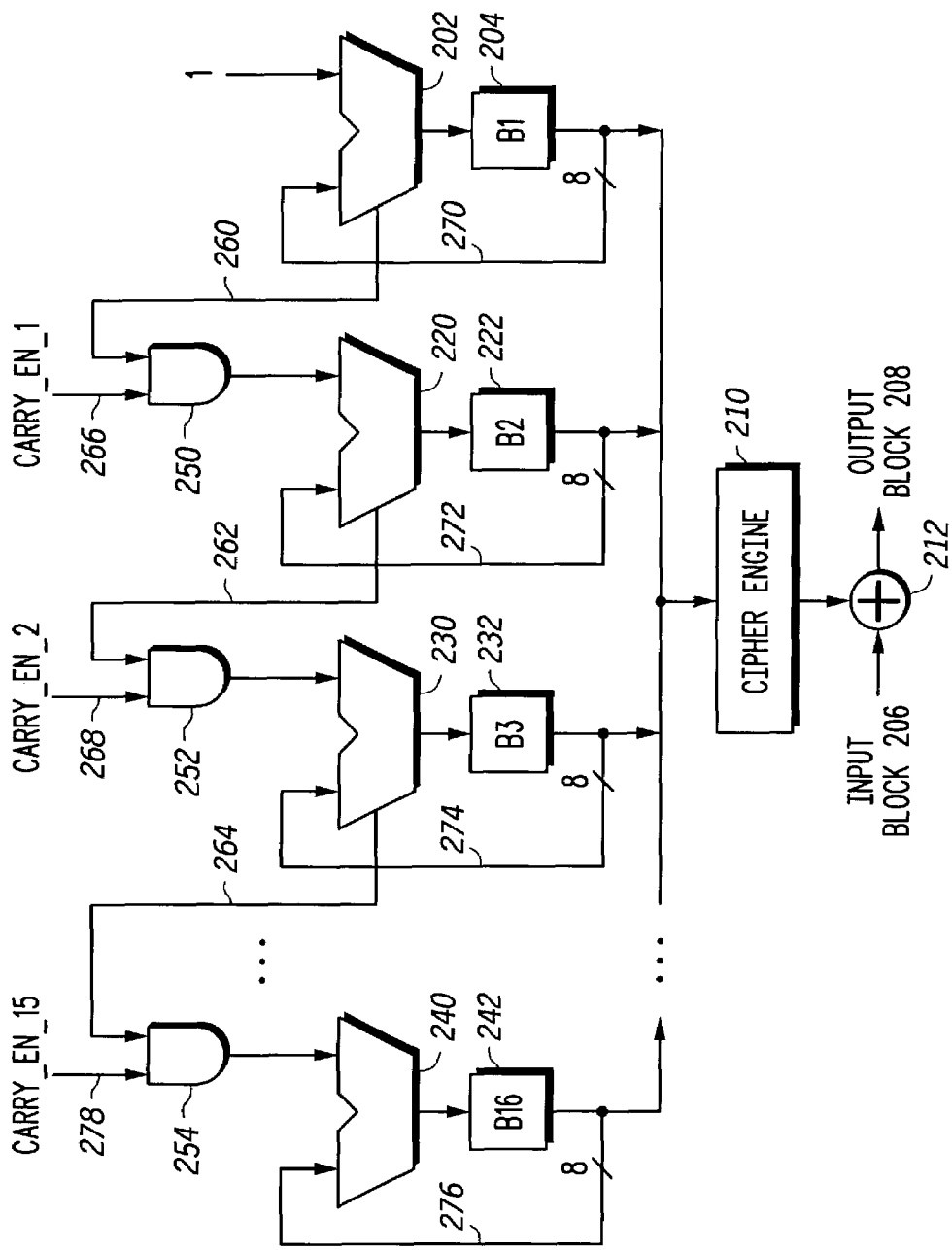
FIG. 2 is a block and logic diagram that illustrates an implementation of counter (CTR) mode logic.

Referring to FIG. 2, an illustrative embodiment of the CTR logic module 134 is illustrated. Alternate embodiments of the present invention may implement the CTR logic module 134 in any appropriate manner. The CTR mode logic block includes a plurality of carry adder units (202, 220, 230, and 240). The CTR logic module also includes a plurality of AND logic gates, such as AND gates 250, 252, and 254, to combine carry enabled inputs 266, 268 and 278 and the prior stage adder carry input 260, 262 and 264. The output of the various adders are fed to output buffers, such as the buffers B1 204, B2 222, B3 232, and B16, 242. The output from these various buffers provides a multi-bit computation result, which is then fed to cipher engine 210 (e.g., one of the cipher engines 112, 114 and 116). The cipher engine 210 performs a cipher operation and its output is then exclusive OR'd with the input block of data 206 using the exclusive OR device 212 to produce a final output block 208. In one embodiment, the exclusive OR device 212 is part of the data synchronization block 106; in an alternate embodiment, the exclusive OR device 212 is part of the CTR logic block 134.

With the CTR mode of operation, a variable modulo size may also be used. In the illustrated embodiment, the modulo size may be programmed between $2^8$ to $2^{128}$. Alternate embodiments may use other ranges for the modulo size. The modulo size controls how many bytes in the counter register (i.e., buffers 204, 222, 232, 242) are incremented by enabling each byte's carry enable 266, 268, 278. In one embodiment of the present invention, the counter mode of operation increments a base value each time a portion of data, such as a block, is processed. The running count is encrypted and the result is exclusive OR'd with the input message block 206. This mode uses a forward cipher function of the underlying cipher engine 210. In one embodiment of the present invention, the counter size is substantially similar to, or the same as, the cipher block size. Alternate embodiments may use any size counter or may perform a counting function in another manner. In one embodiment, the increment function does not use the carry out; rather, the counter is modulo $2^n$ where 'n' is an integer that may be specified in hardware or software. The next block counter value is calculated while the current block is being processed. Rather than implementing a full 128-bit counter, 8-bit counters may be used to avoid, or at least reduce, long timing path delays. Two serial 8-bit full adders may alternately be used to provide a sliding window approach to increment two bytes of the counter register (i.e., buffers 204, 222, 232, 242) within each clock cycle. In one embodiment, a total of eight clock cycles would be used to increment a 128-bit counter modulo $2^{128}$. Alternate embodiments may count in a different manner and/or at a different rate.

Figure 3:
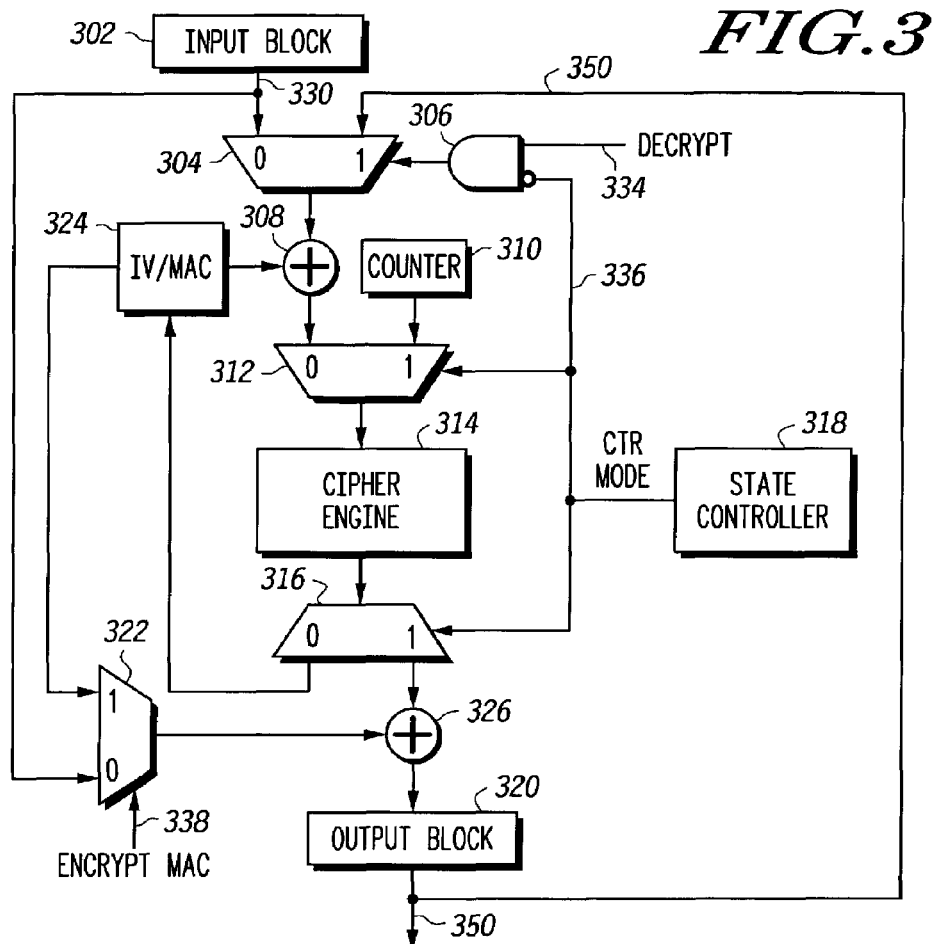
FIG. 3 is a logic diagram that illustrates an implementation of CCM mode logic.

Referring to FIG. 3, an illustrative embodiment using CCM mode logic module is shown. Alternate embodiments of the present invention may implement CCM mode logic 132 in any appropriate manner. The CCM mode using logic module 132 includes input block 302, input multiplexor 304, an exclusive OR device 308, a second multiplexor 312, cipher engine 314, output de-multiplexor 316, output exclusive OR device 326, and output block 320. The input exclusive OR device 302 is responsive to the initialization vector/MAC input 324. The output exclusive OR device 326 is responsive to a demultiplexor 322, which receives enable encrypted MAC 338. The input multiplexor 304 and the intermediate stage multiplexor 312 are each controlled by counter mode enable signal 336, which is produced by a state controller module 318 and fed to gate 306 together with the decrypt signal input 334. The multiplexor 304 has a first input from input block 302 and a second input from data 350 produced by output block 320. The state controller module 318 provides state transition control for driving the entire CCM circuit 132. The cipher engine 314 represents one of the cipher modules 112, 114, and 116 of FIG. 1.

In the illustrated embodiment, CCM mode provides both privacy functions (using CTR encryption) and integrity (using CBC MAC). A two-pass approach is used to process the input block 302. Alternate embodiments may use a different number of passes. In one embodiment of the present invention, the CCM mode operates above the CBC and CTR modes of operation. The cipher function is held in encrypt (forward cipher) mode regardless of the direction of data flow between the sender and receiver. The finite state machine (not shown) within the state controller 318 alternates between the privacy mode of operation and the integrity mode of operation. In one embodiment, the state machine has the following operating states:

a. initialization phase (encrypt all zero blocks in CBC mode, encrypt initial counter in CTR mode, XOR encrypted counter with received MAC to recover original MAC when decrypting)

b. process header phase (encrypt input blocks in CBC mode)

c. process data blocks (encrypt/decrypt input blocks in CTR mode, encrypt plain text blocks in CBC mode)

d. process final data block (encrypt/decrypt final input block in CTR mode and pad result, encrypt final plain text block in CBC mode, and store padded result as MAC)

e. encrypt MAC tag (XOR the MAC tag with the initial encrypted counter from the first state)

Alternate embodiments of the present invention may use a different state machine, combination logic, or any type of circuitry to implement state controller 318.

Figure 4:
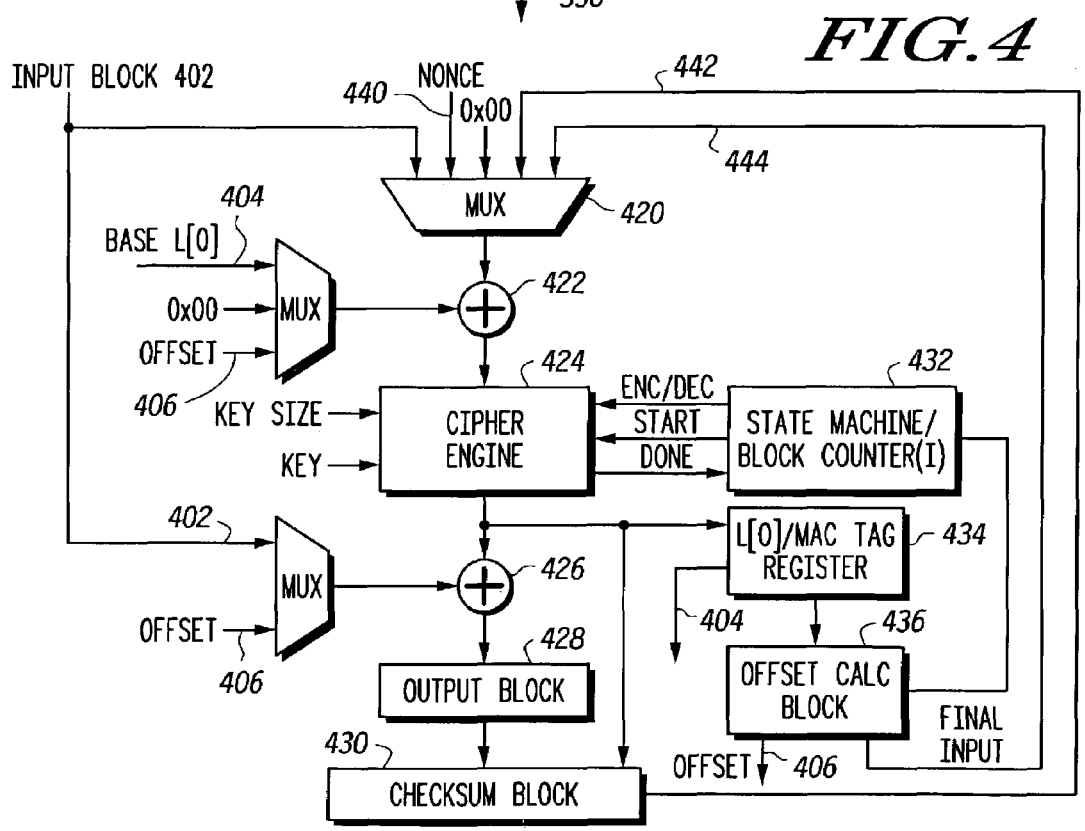
FIG. 4 is a block and logic diagram that illustrates an implementation of OCB mode logic.

Referring to FIG. 4, an illustrative embodiment of a circuit for performing an OCB mode of operation is disclosed. In an alternate embodiment, the OCB mode logic may be implemented in any appropriate manner. The OCB mode circuit 136 includes an input multiplexor 420; exclusive OR device 422; an offset multiplexor fed from base value 404 from base value/MAC register 434, zero value, and offset 406; cipher engine 424 (one of cipher engines 112, 114, and 116); an output exclusive OR 426, output block 428; and final checksum block 430. The cipher engine 424 is coupled to state machine 432, and MAC tag register 434 coupled to the offset calculation block 436. The output exclusive OR device 426 is coupled via a mux input to offset value 406 and to the input data block 402 provided by the data synchronization block 106. The input multiplexor 420 receives input data block 402, a Nonce value 440, a zeroed value, a checksum block output 442, and a final input 444 generated by the offset calculation block 436. The multiplex 420 feeds its output to the input of exclusive OR 422 and the result is fed to the cipher engine 424. The cipher engine 424 receives key size values, a key value, start control, and encryption/decryption selection from the state machine/counter module 432. The cipher engine 424 produces an output, which is fed to the L[0]/MAC tag register 434 and to the exclusive OR device 426. Exclusive OR device 426 combines the offset 406 or input block 402 with the output from the cipher engine 424 to create an output value for the output block 428. The output block 428 then feeds the checksum block 430 for comparison between the input block 402 and the output block 428. Finally, the checksum block 430 produces the checksum result 442, which is fed back to the input multiplexor 420.

Figure 5:
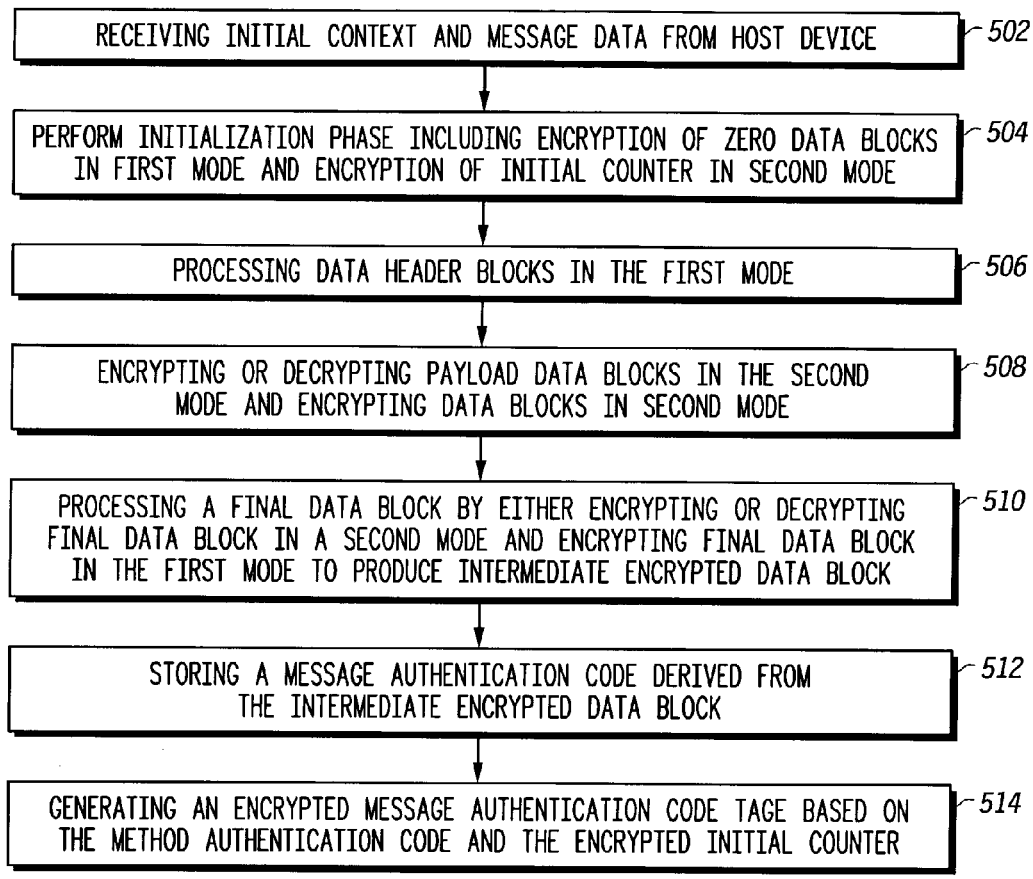
FIG. 5 is a flow chart that illustrates a method of performing encryption in CCM mode.

Further details on one method of operation of the CCM mode referred to in FIG. 3 are illustrated in the flow chart of FIG. 5. In an alternative embodiment, the CCM method of operation may be implemented in any appropriate manner. An initial context and data message is received from a host device, at step 502. An initialization phase is then performed which includes steps of encrypting zero data blocks in a first mode and encrypting an initial counter value in a second mode, at 504. The data header blocks are processed in the first mode, at 506, and either encrypting or decrypting the input payload data block in the second mode is performed and encryption (hashing) of data blocks is handled in the first mode, at step 508. A final data block is processed using either encryption or decryption of the final data block in the second mode and encryption of the final data block in the first mode to produce an intermediate encrypted data block result, at step 510. A message authentication code (MAC) is then stored. The stored MAC value is derived from the encrypted data block, as shown at step 512. An encrypted MAC tag is then generated based on the MAC value and based on the initial encrypted counter value, as shown at step 514.

Figure 6:
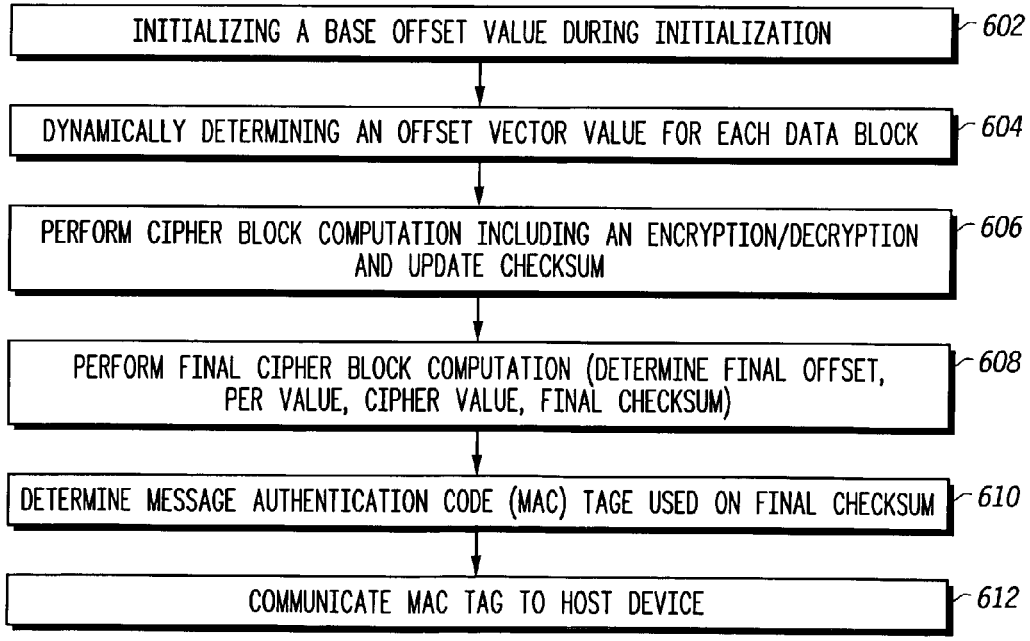
FIG. 6 is a flow chart that illustrates an OCB mode operation.

Referring to FIG. 6, one possible method of operation in the OCB mode is disclosed. In an alternative embodiment, any other appropriate OCB operation may be implemented. At step 602, a base offset value (also referred to as L[0]) is set during an initialization phase. The offset vector value is then dynamically determined, at step 604. A cipher block computation is performed which includes an encryption, decryption and update checksum operation, as shown at step 606. The final cipher block computation is then performed, at 608. This final cipher block computation typically determines the final offset value, a pad value, a cipher value, and a final checksum. A message authentication code (MAC) tag is then determined based on the final checksum, as shown at step 610. Finally, the MAC tag is then communicated to the host device, as shown at step 612.

Figure 7:
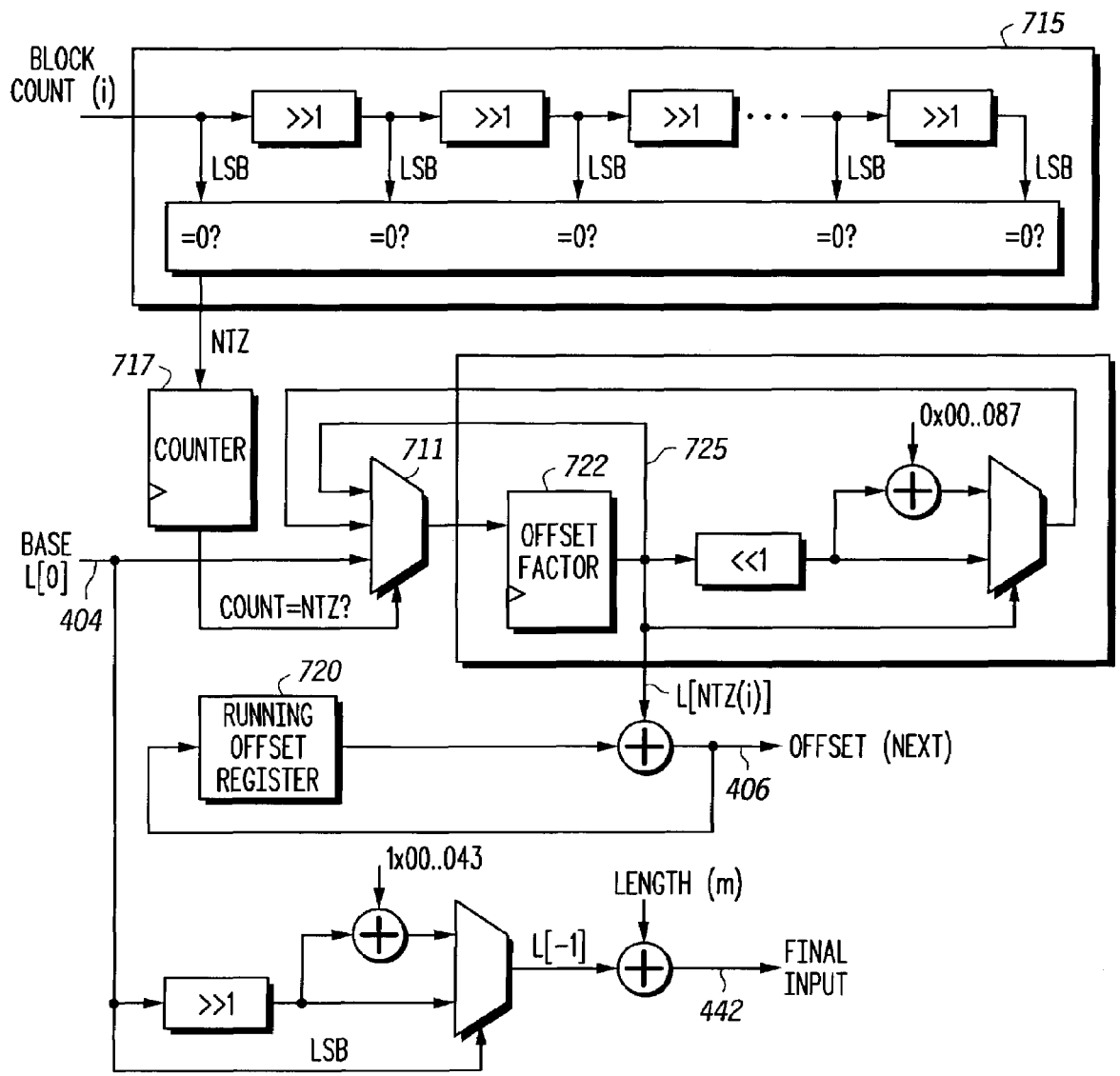
FIG. 7 is a block and logic diagram that illustrates an implementation for calculating an offset.

FIG. 7 is an illustrative embodiment of generating offset values in accordance with steps 602 and 604 (see FIG. 6) and as depicted in 436 (see FIG. 4), where each block has a unique offset value. In an alternative embodiment, other appropriate methods may be used. The offset values are generated from the base offset factor (L [0]) 404 and the initial offset value 406. Since the cipher engine 424 takes multiple cycles to process a single block, the next offset value can be calculated in parallel. In the illustrated embodiment, computing the next offset consists of three basic functions:

Determining the number of trailing (least-significant) zeros in the current block count value.

Generating the offset factors L [1], L [2], . . . , L[n] at 720, eXclusive-ORing the current running offset 406 with the offset factor L[n] 722.

The initial offset value prior to calculating the first block's offset (i=1) is the encrypted result of base value L [0] 404 selected through multiplexor 711 exclusive ORed with the nonce value 440 and stored as 406. For each subsequent block (i>=1) the offset is predicted by first calculating the NTZ (number of trailing zeros from least significant bit (LSB) to most significant bit (MSB) using an NTZ counter 715. NTZ counter 715 determines a number of trailing zeros by right-shifting the block counter value (i) one bit at a time and testing the LSB of the result. If the LSB is "0", the NTZ value is incremented. This process is repeated until the right-shifted LSB is a "1". The "NTZ" counter is incremented each time. This, in turn, controls how many iterations (n) are run to determine the offset factor L[n] 725.

In another embodiment, the semiconductor device includes a programmable control register having at least one data field indicative of at least one selected cipher mode, at least one selected cipher interface to at least one of a plurality of different cipher hardware modules, and central mode control logic responsive to the at least one cipher interface and responsive to the programmable control register.

In another embodiment, the semiconductor device includes a cipher mode register; a first cipher mode logic module responsive to the cipher mode register; a second cipher mode logic module responsive to the cipher mode register; a data synchronization module coupled to the first cipher mode logic module, to the second cipher mode logic module, to an input buffer, and to an output buffer; and a multiplexed interface coupled to the data synchronization module, and a plurality of different cipher engine hardware modules coupled to the multiplexed interface.

In another embodiment, the semiconductor device comprises a register including at least one field to store a counter modulus value; a counter mode logic module responsive to the register, the counter mode logic module including carry-enabled adders to support variable modulus size data; and a data synchronization module having a first input responsive to the counter mode logic module, a second input responsive to an input data buffer, and an interface to a plurality of cipher engine hardware modules.

In another embodiment, the semiconductor device comprises a cipher mode register; an offset code book mode logic module responsive to the cipher mode register, the offset code book mode logic module implemented using dynamically generated offset values; a data synchronization module coupled to the offset code book mode logic module and coupled to an input buffer and to an output buffer; and an interface to a plurality of different cipher engine hardware modules.

In another embodiment, the semiconductor device comprises a cipher mode register; a first cipher mode logic module responsive to the cipher mode register, the first cipher mode logic module configured to provide an offset code book mode; a second cipher mode logic module responsive to the cipher mode register, the second cipher mode logic module configured to provide combined counter cipher mode with cipher block chaining with message authentication code cipher mode (CTR and CBC-MAC mode, i.e., CCM); a data synchronization module coupled to the first cipher mode logic module and to the second cipher mode logic module and coupled to an input buffer and to an output buffer; and an interface a plurality of different cipher engine hardware modules.

In a particular embodiment, a method of performing an encryption operation using a first mode of operation and a second mode of operation of a security processing device is disclosed. The method includes receiving initial context and message data from a host device; performing an initialization phase including encryption of zero data blocks in the first mode and encryption of an initial counter in the second mode to generate an encrypted initial counter; processing data header blocks in the first mode; processing data blocks by performing one of encryption and decryption of input blocks in the second mode and encryption (hashing) of text blocks in the first mode; processing a final data block by one of encryption and decryption of the final data block in the second mode and encrypting the final data block in the first mode to produce an encrypted data block and storing a message authentication code derived from the encrypted data block; and generating an encrypted message authentication code tag based on the message authentication code and the encrypted initial counter.

In another embodiment, a method of performing an operation in an offset code book mode using a security processor is disclosed. In this embodiment, the method comprises performing an initialization phase including initializing a base offset value; dynamically determining an offset factor value; performing a cipher block computation including performance of an encryption operation and determination of a checksum; performing a final cipher block computation including determining a final offset, a pad value, a cipher value, and a final checksum based on the cipher value; and determining a message authentication code tag based on the final checksum.

The above disclosed subject matter is to be considered illustrative and the appended claims are intended to cover all such modifications and other embodiments which fall within the true spirit and scope of the present invention. Other embodiments, variations and enhancements are anticipated, for example, while the logic modules 130-138 are illustrated as discrete logic, they may also share common logic functions. Likewise, the illustrated design may be implemented using synthesizable program such as Verilog/RTL and reusable software constructs. Thus, to the maximum extent allowed by law, the scope of the present invention is to be determined by the broadest possible interpretation of the following claims and their equivalents, and shall not be restricted or limited by the foregoing detailed description.

What is claimed is:

1. A semiconductor device comprising:
   a cipher mode register to store a cipher mode indicator;
   a plurality of different cipher engine modules, each one of the cipher engine modules to implement a corresponding one of a plurality of different cipher operations;
   a plurality of different cipher mode logic modules, each one of the cipher mode logic modules to receive logic module input information and to implement a corresponding one of a plurality of different cipher modes on the logic module input information, the plurality of different cipher mode logic modules including
   a first cipher mode logic module configured to provide logic module output information based upon the received logic module input information to at least one of the plurality of different cipher engines to implement a first cipher mode; and
   a second cipher mode logic module configured to provide logic module output information based upon the received logic module input information to at least one of the plurality of different cipher engines to implement a second cipher mode;
   a data synchronization module coupled to receive input information and to selectively provide the logic module input information to one of the plurality of different cipher mode logic modules selected based upon the cipher mode indicator, the logic module input information based upon the input information; and
   an interface coupled to receive cipher engine input information and to selectively provide, based upon a cipher mode of the one of the plurality of different cipher mode logic modules, the cipher engine input information to one of the plurality of different cipher engine modules, the cipher engine input information based upon the logic module output information from the one of the plurality of different cipher mode logic modules.

2. The semiconductor device of claim 1, wherein each one of the plurality of different cipher modes implements a corresponding different security function of a plurality of security functions.

3. The semiconductor device of claim 2, wherein one of the plurality of security functions encrypts information.

4. The semiconductor device of claim 2, wherein one of the plurality of security functions decrypts information.

5. The semiconductor device of claim 4, wherein a different one of the plurality of security functions encrypts information.

6. The semiconductor device of claim 2, wherein, in response to the one of the plurality of cipher mode logic modules being selected by the cipher mode register, the cipher mode register is to further store a context data to configure the one of the plurality of cipher mode logic modules based upon the context data.

7. The semiconductor device of claim 6 wherein the context data includes an initialization vector.

8. The semiconductor device of claim 6, wherein the context data includes offset data.

9. The semiconductor device of claim 6, wherein the context data includes a counter value.

10. The semiconductor device of claim 6, wherein the context data includes a checksum.

11. The semiconductor device of claim 2, wherein the cipher mode register is to store the cipher mode indicator in response to receiving the cipher mode indicator from a host device.

12. A semiconductor device comprising:
a plurality of different cipher hardware modules, wherein each one of the plurality of different cipher hardware modules is to implement a corresponding one of a plurality of different cipher operations;
a programmable register having at least one data field including a mode data field indicative of a selected cipher mode; and
a central mode control logic to receive input information, the central mode control logic including
a first cipher mode logic module to be selected in response to the mode data field indicating a first cipher mode, and in response to the first cipher mode logic module being selected the central mode control logic
to provide first information based on the input information to a first cipher hardware module of the plurality of the different cipher hardware modules for processing, and
to receive second information based on the first information from the first cipher mode hardware module; and
a second cipher mode logic module to be selected in response to the mode data field indicating a second cipher mode, and in response to the second cipher mode logic module being selected the central mode control logic
to provide second information based on the input information to the first cipher hardware module of the plurality of different cipher hardware modules for processing, and
to receive third information based on the first information from the second cipher hardware module.

13. The semiconductor device of claim 12, wherein each one of the first cipher mode and the second cipher mode implements a corresponding different security function.

14. The semiconductor device of claim 13, wherein the first cipher mode implements an encryption function.

15. The semiconductor device of claim 13, wherein the first cipher mode implements an encryption function.

16. The semiconductor device of claim 15, wherein the second cipher mode implements a decryption function.

17. A method comprising:
receiving input data at a semiconductor device, wherein a security function is to be applied to the input data;
receiving first information based upon the input data at a selected cipher mode logic module selected from a plurality of cipher mode logic modules at the semiconductor device, the selected cipher mode logic module selected based upon a mode indicator stored at a programmable register at the semiconductor device indicating a cipher mode to be implemented by the selected cipher mode logic module, the selected cipher mode logic module being one of a first cipher mode logic module to implement a first security function and a second cipher mode logic module to implement a second security function;
providing second information based upon the first information from the selected cipher mode logic module;
receiving third information based upon the second information at a selected cipher engine module of a plurality of different cipher engine modules at the semiconductor device, the selected cipher engine module selected based upon the selected cipher mode logic module, and the selected engine module being one of a first cipher engine module that performs a first cipher operation and a second cipher engine module that performs a second cipher operation; and
providing fourth information based upon the third information from the selected cipher engine module.

18. The method of claim 17 further comprising:
receiving a first mode indicator to indicate the first cipher mode logic module is to be selected; and
storing the first mode indicator at the programmable register.

19. The method of claim 18 further comprising:
receiving a second mode indicator subsequent to storing the first mode indicator, the second mode indicator to indicate the first cipher mode logic module is to be selected; and
storing the first mode indicator at the programmable register.

20. The method of claim 17 wherein the first security function is an encryption function and the second security function is a decryption function.

* * * * *